United States Patent
Milton et al.

(10) Patent No.: US 7,090,177 B2
(45) Date of Patent: Aug. 15, 2006

(54) DEVICE FOR OPTICS ALIGNMENT AND MOUNTING

(75) Inventors: Scott C. Milton, Maplewood, MN (US); Torsten J. R. Blaetter, Oakdale, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/716,713

(22) Filed: Nov. 19, 2003

(65) Prior Publication Data

US 2005/0103972 A1    May 19, 2005

(51) Int. Cl.
*F16M 11/02* (2006.01)
*H04N 1/04* (2006.01)

(52) U.S. Cl. .............................. 248/180.1; 248/188.2; 358/474; 358/497

(58) Field of Classification Search ................ 248/669, 248/180.1, 181.1, 182.2, 188.4, 487; 356/139.02, 356/139.05, 139.06, 138; 358/474, 483, 358/296, 471, 497, 494, 496; 359/197
See application file for complete search history.

(56) References Cited

U.S. PATENT DOCUMENTS

| | | | |
|---|---|---|---|
| 2,726,834 A * | 12/1955 | Hoge ...................... 248/180.1 |
| 4,205,349 A * | 5/1980 | Kawazu et al. ............. 358/496 |
| 4,318,135 A | 3/1982 | Allis et al. |
| 4,457,017 A * | 6/1984 | Onogi et al. ................ 382/295 |
| 4,621,899 A * | 11/1986 | Hoult et al. ................ 359/896 |
| 4,652,095 A * | 3/1987 | Mauro ........................ 359/393 |
| 4,972,079 A | 11/1990 | Blanding |
| 5,029,791 A * | 7/1991 | Ceccon et al. ........... 248/287.1 |
| 5,214,441 A | 5/1993 | Blanding et al. |
| 5,294,943 A | 3/1994 | Blanding et al. |
| RE35,514 E * | 5/1997 | Albrecht et al. ............ 250/216 |
| 6,473,205 B1 * | 10/2002 | Pepe .......................... 358/483 |

* cited by examiner

*Primary Examiner*—Anita King
*Assistant Examiner*—Tan Le
(74) *Attorney, Agent, or Firm*—William F. Noval

(57) ABSTRACT

A method of aligning an optics deck in six degrees of freedom comprising: mounting an optics deck having a scanline slot on an optics alignment station by means of three adjustable leveler assemblies located at three apexes of a triangle which enclose the slot and whose sides establish axes about which adjustment of the leveler assemblies is carried out such that the bottom surface of the optics deck is parallel to the optics alignment station and at a known height relative to the optics alignment station; translating the optics deck to bring it into proper optical alignment by translating the deck linearly along an axis coincident with the center line of the slot and rotationally about first and second points coincident with the end points of the scan line; and fixing the optics deck after the translating to the leveler assemblies.

2 Claims, 11 Drawing Sheets

DEVICE FOR OPTICS ALIGNMENT AND MOUNTING

FIELD OF THE INVENTION

This invention relates in general to an optical imaging system and more particularly to a device and method used to align the optics module in a standalone alignment fixture and a method to allow for accurate transfer of the aligned optics module from the fixture to the machine in which it will be mounted for use in the field.

BACKGROUND OF THE INVENTION

In optical imaging systems, such as laser printers, using optics modules, it is very important to properly align the optics module to the film plane of the imaging unit. Failure to do so will result in a misalignment of the image to the film or in a focusing error. Proper alignment is typically done in one of two ways. The optics module is either aligned in the machine in which it will be used, or it is aligned in an alignment fixture outside of the machine and then transferred to the machine.

U.S. Pat. No. 4,318,135, issued Mar. 2, 1982, inventors Allis et al., discloses an alignment system for scanning arrays. A linear array of photosensitive elements is mounted on a carrier which is in turn attached to a floating block. Threaded members can be moved in engagement with the block to provide adjustment of the array in three degrees of freedom in the plane of the array. The blocks can be adjusted in a plane perpendicular to the plane of the array by means of axially extending screws. One problem of the mount shown in this patent is that adjustment of any one of the threaded members produces motion of the array in more than one degree of freedom. This results in interactive adjustments requiring an interactive process which is difficult and time consuming.

Other optical device alignment techniques are disclosed in the following patents: U.S. Pat. No. 4,972,079 (corresponding to WO 91/01507), issued Nov. 20, 1990, inventor Blanding, discloses a mount for an optical device, such as a linear CCD array. The array is mounted on a base which is supported on a frame for adjustment relative thereto. The base is slidably movable on the frame for adjustment of the array in in-track and cross-track directions. The base is movable toward and away from the frame. Adjustment screws are provided to carry out adjustments.

U.S. Pat. No. 5,214,441, Issued May 25, 1993, inventors Blanding et al., and U.S. Pat. No. 5,294,943, issued Mar. 15, 1994, inventors Blanding et al., discloses techniques for aligning scan line optics with a target medium, such as a recording medium.

One of the problems disclosed in U.S. Pat. No. 4,972,079, issued Nov. 20, 1990, inventor Blanding, is that adjustment in any one axis of an alignment fixture is likely to affect the other axes. They disclose a method to prevent such axis cross-talk. However, no method is given for ensuring accurate repositioning of the aligned optics module within the machine. Similarly, problems disclosed in U.S. Pat. No. 5,294,943, issued Mar. 15, 1994, inventors Blanding et al., and U.S. Pat. No. 5,214,441, issued May 25, 1993, inventors Blanding et al., address a method to ensure accurate repositioning of the aligned module, but they do not address a method for preventing cross-axis talk.

SUMMARY OF THE INVENTION

According to the present invention, there is provided a solution to these problems.

According to a feature of the present invention, there is provided a method of aligning an optics deck in six degrees of freedom comprising:

mounting an optics deck having a scanline slot on an optics alignment station by means of three adjustable leveler assemblies located at three apexes of a triangle which enclose said slot and whose sides establish axes about which adjustment of said leveler assemblies is carried out such that the bottom surface of said optics deck is parallel to said optics alignment station and at a known height relative to said optics alignment station;

translating said optics deck to bring it into proper optical alignment by translating said deck linearly along an axis coincident with the center line of said slot and rotationally about first and second points coincident with the end points of said scan line; and fixing said optics deck after said translating to said leveler assemblies.

ADVANTAGEOUS EFFECT OF THE INVENTION

The invention has the following advantages.

1. Axis cross-talk in the alignment process is minimized.
2. Accurate transfer of the aligned optics module from the alignment station to the machine in which it is to be installed is effected.

DETAILED DESCRIPTION OF THE INVENTION

According to the present invention there is provided a technique for aligning an optics module in an optical imaging system, such as a laser printer. The optics module can include a diode laser, a reciprocating or rotating mirror which produces a repetitive line scan which is imaged through a slot in the module to a medium such as film. In such a system, it is desirable to carry out alignment in six degrees of freedom without axis cross talk and in a standalone alignment fixture that requires few or no alignment procedures after the optical module has been installed in the imaging system. The technique of the present invention fulfills these needs.

Referring now to FIGS. 1–7, there is shown one embodiment of the present invention. As shown, optics deck 10 including planar member 10A is mounted on optics alignment station 11 for alignment in six degrees of freedom. The optical components mounted on optics deck 10 are not shown for clarity of description. Such components can include a laser diode which emits a laser beam, a rotating or reciprocating first mirror, for deflecting the laser beam along a line scan, optical elements for controlling the shape, focus and path of the laser beam to the first mirror, a second, flat mirror for deflecting the scanning laser beam through a slot on the optics deck to a recording medium, such as film, and optical elements located between the first and second mirrors for correcting differences in beam focus and beam displacement.

Figure 2:
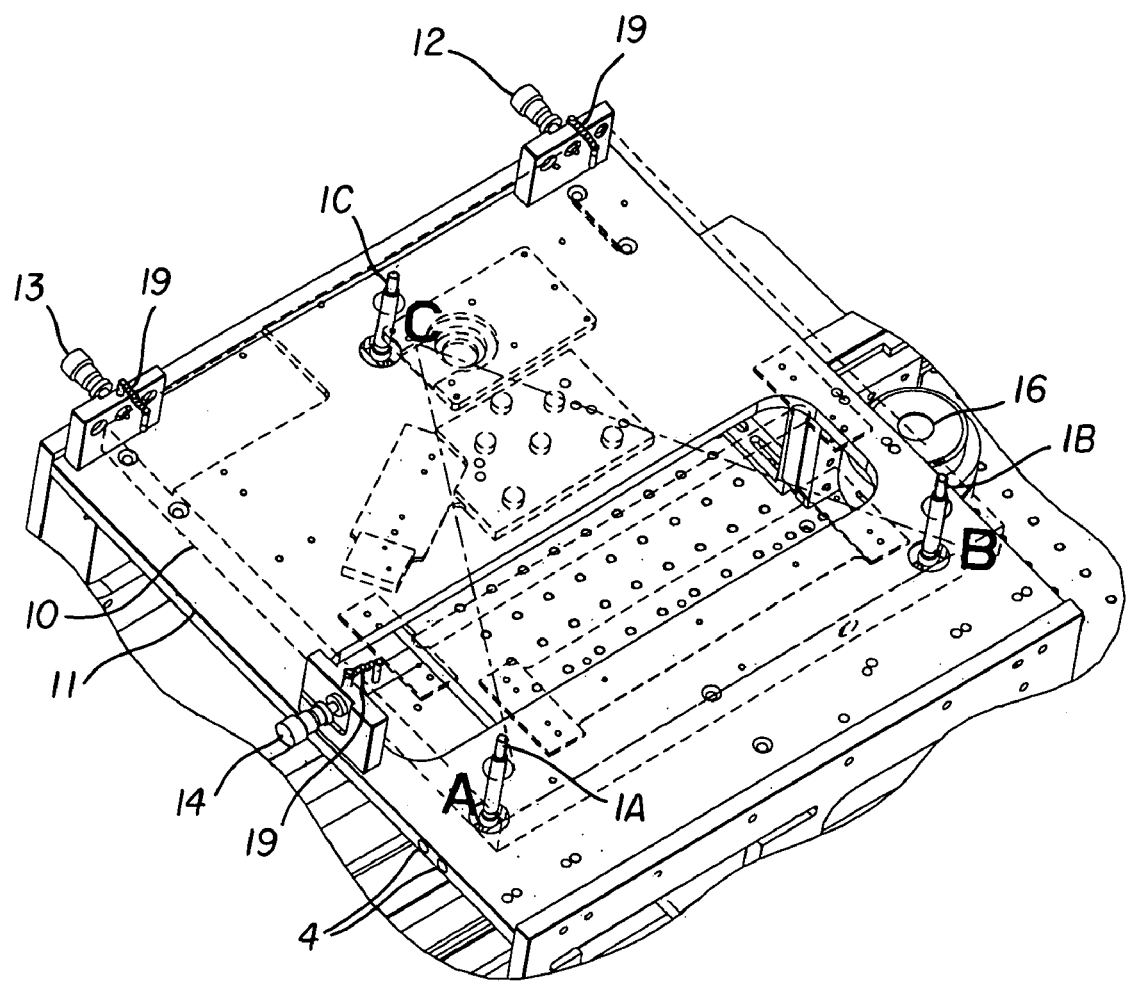
FIG. 2 is a top perspective view which show a detail of how the leveler on the optics module assembly interfaces with a pin on the optics alignment station. It also shows the axis of rotation A-C, A-B, & B-C for the optics module assembly tilt adjustments.
Figure 6:
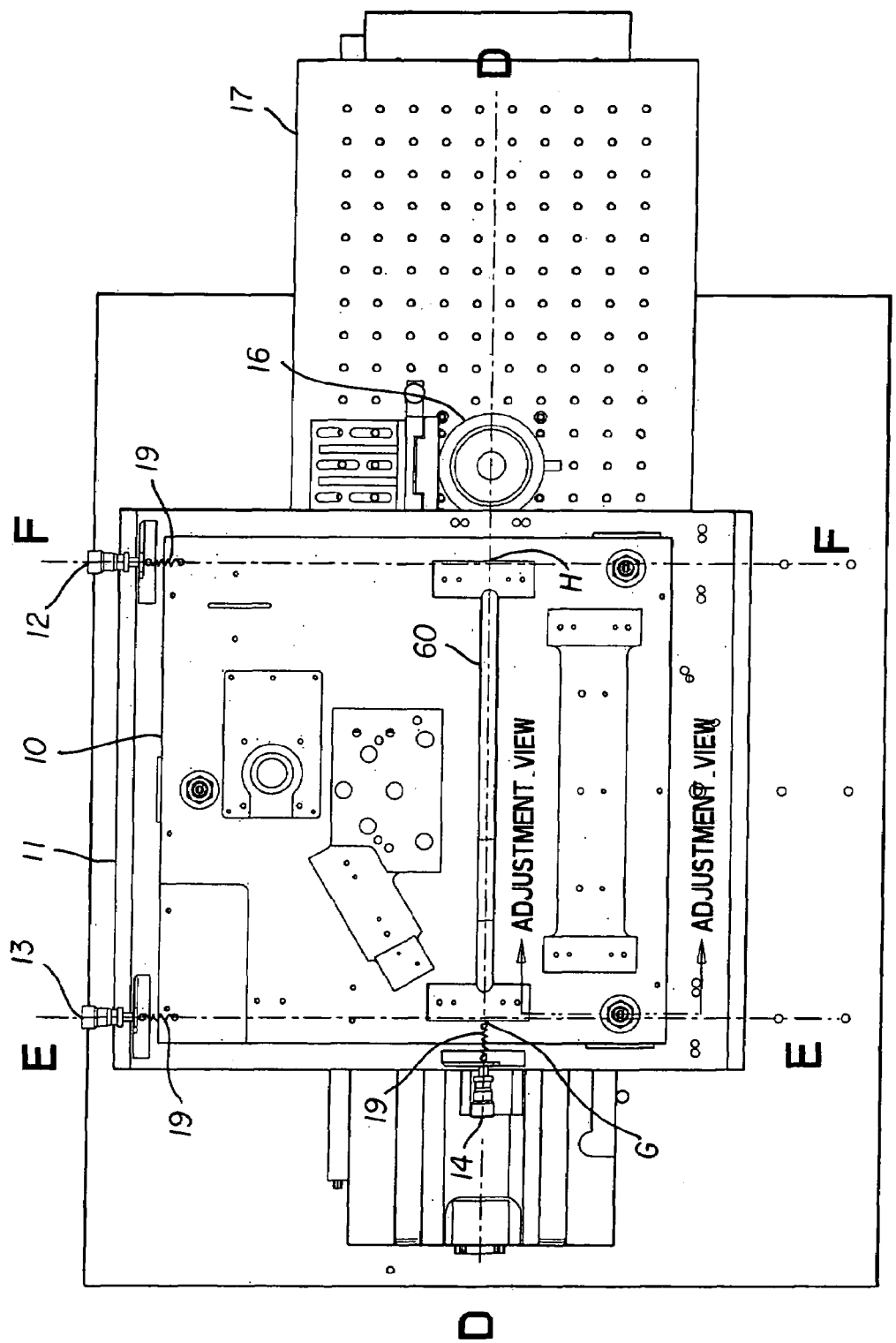
FIG. 6 is a top plan view of the optics module of FIG. 1 which shows the axis lines D—D, E—E, & F—F for adjustment of the optics module assembly.

The six degrees of freedom used to align the optics deck are pitch, roll and yaw about axes AB, AC and BC shown in FIG. 2 and translation along axis D—D and rotation about points G and H shown in FIG. 6. In FIG. 2, points A, B, C are on the centerlines of their respective levelers 1A, 1B and 1C. In FIG. 6, axis D—D is along the center line of slot 60 through which a laser beam scanline is projected to media below when optics deck 10 is installed in equipment it is to be used. Points G and H are the end points of such a scanline at the media plane.

Figure 3:
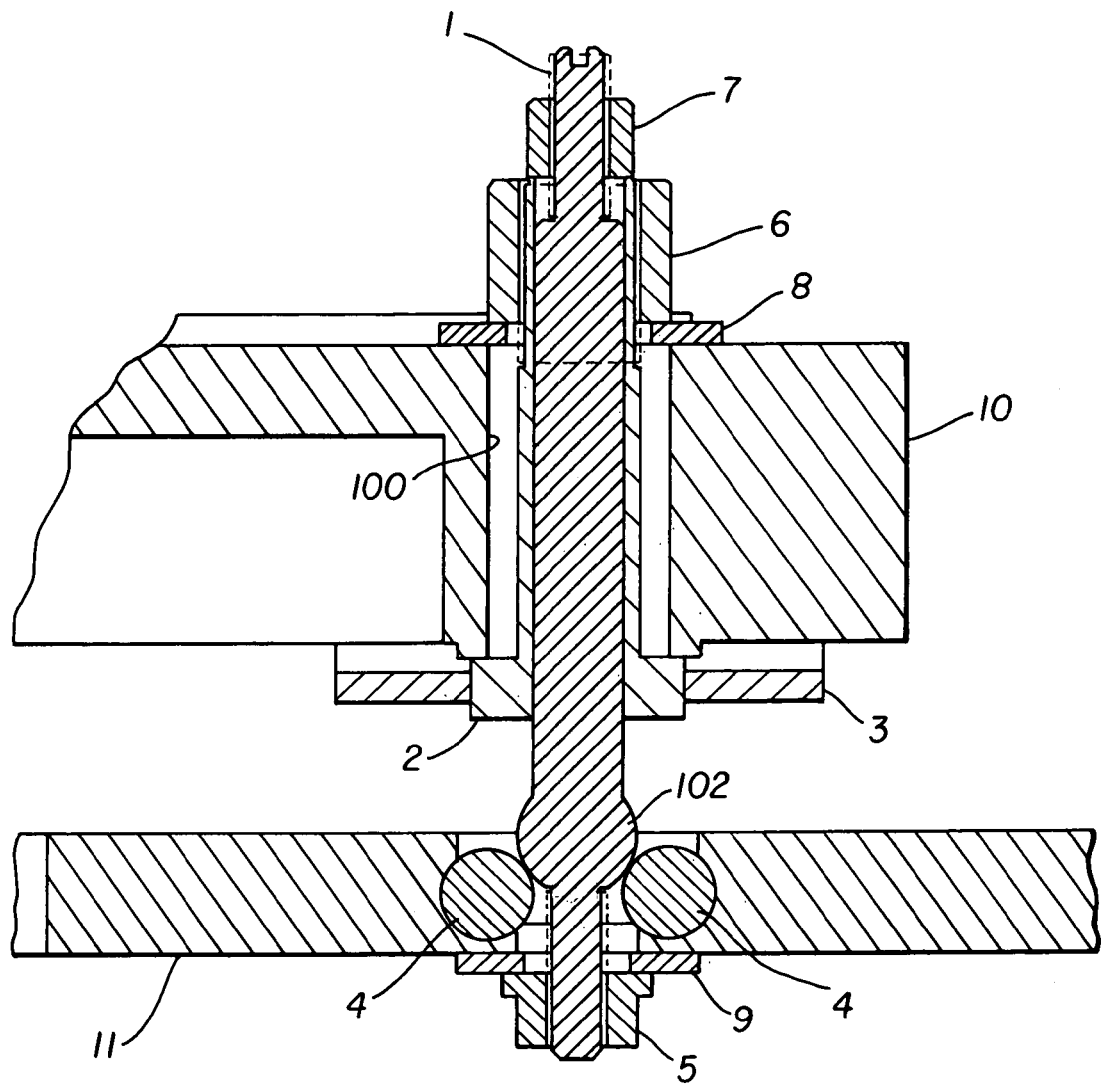
FIG. 3 is a partially sectional, elevational view which shows a detail of how the invention of FIG. 1 interfaces.
Figure 7:
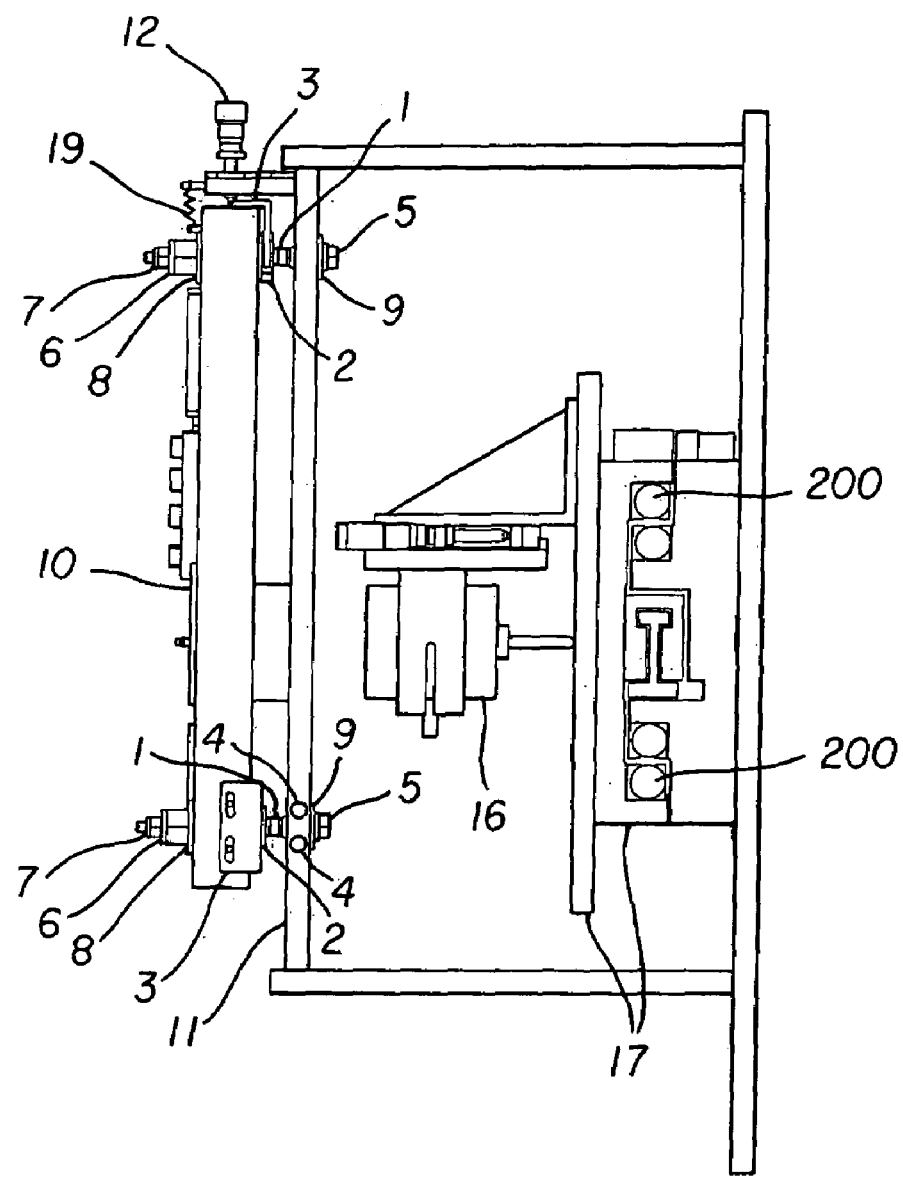
FIG. 7 is an elevational view of the optics module of FIG. 1 rotated 90° which shows the translating portions of the alignment station.

Referring to FIGS. 2 and 3: the leveler 1 and leveler mount 2 are installed in an oversize hole 100 in the optics deck 10 in three places. Rotation is prevented by leveler mount holder 3. The sphere 102 at the bottom of the leveler 1 contacts the pins 4 installed in the optics alignment station 11. This provides six points of contact, which totally defines the location of the optics deck 10 in relationship to the optics alignment station 11. Now the optics deck 10 needs to be aligned to the detection device 16 installed on the translation table 17. Device 16 is mounted on table 17 which slides on bearings 200 (FIG. 7). The optics deck 10 is adjusted for pitch, roll and yaw, about axes AB, AC and BC by adjusting the positions of the leveler 1A, 1B and 1C in relationship to their respective leveler mounts 2. This is accomplished by means of a fine pitch thread on both items. Levelers 1A, 1B, 1C are also adjusted in the Z axis to set elevation and focus depth.

Figure 1:
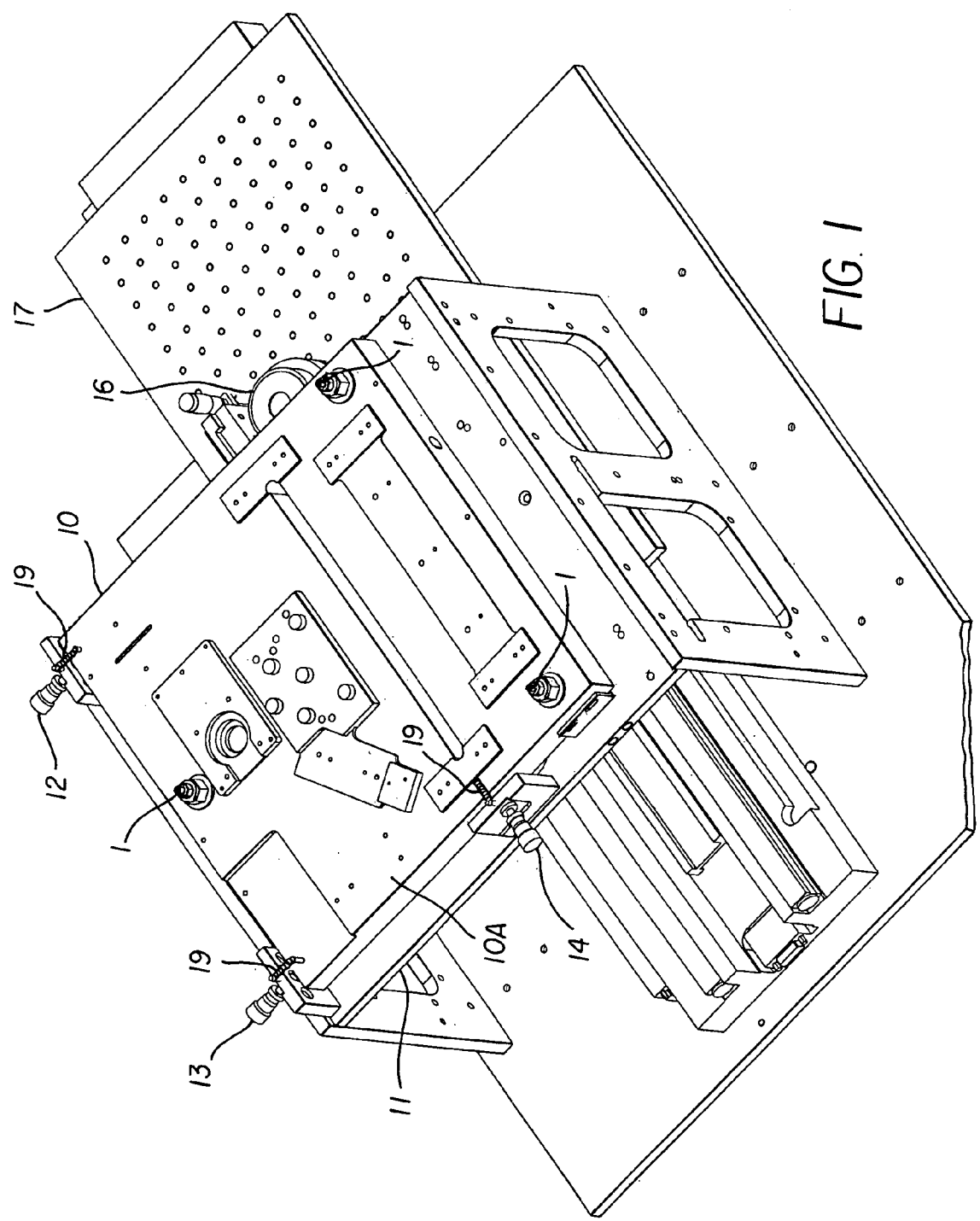
FIG. 1 is a top perspective view of an optical module including the present invention which shows the placement of the optics module assembly on the optics alignment station.
Figure 4:
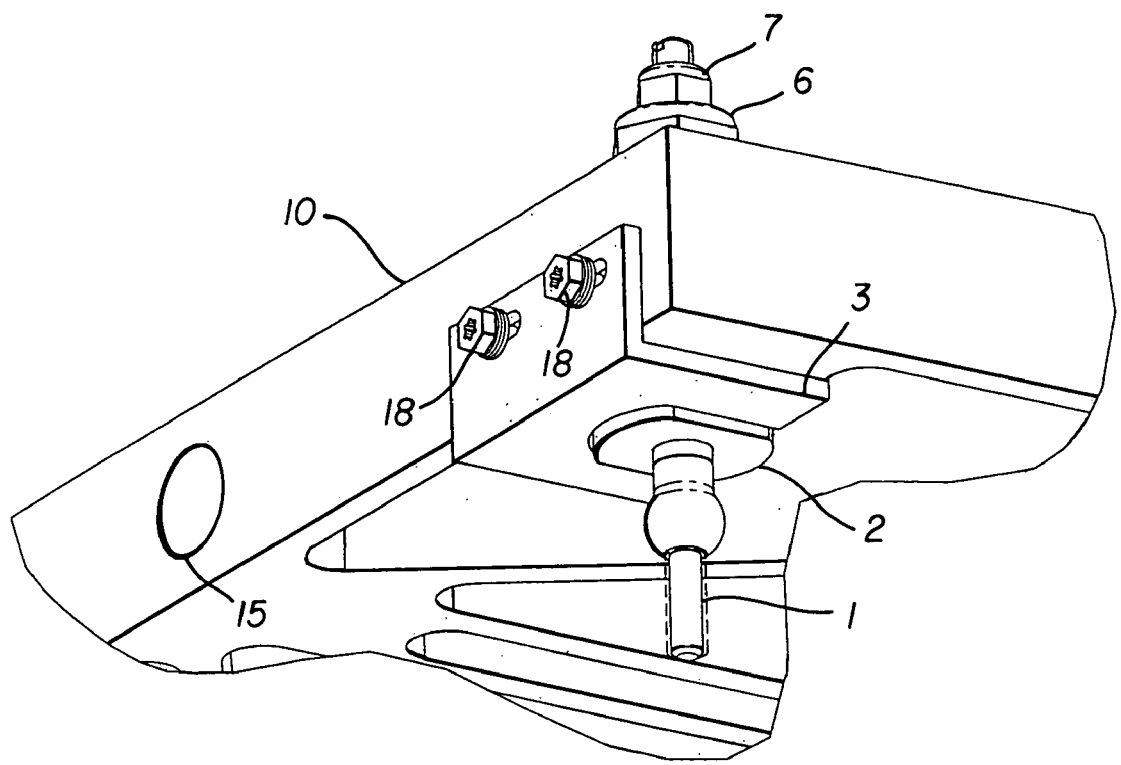
FIGS. 4 and 5 are perspective views which help clarify how the holder, leveler mount work.
Figure 5:
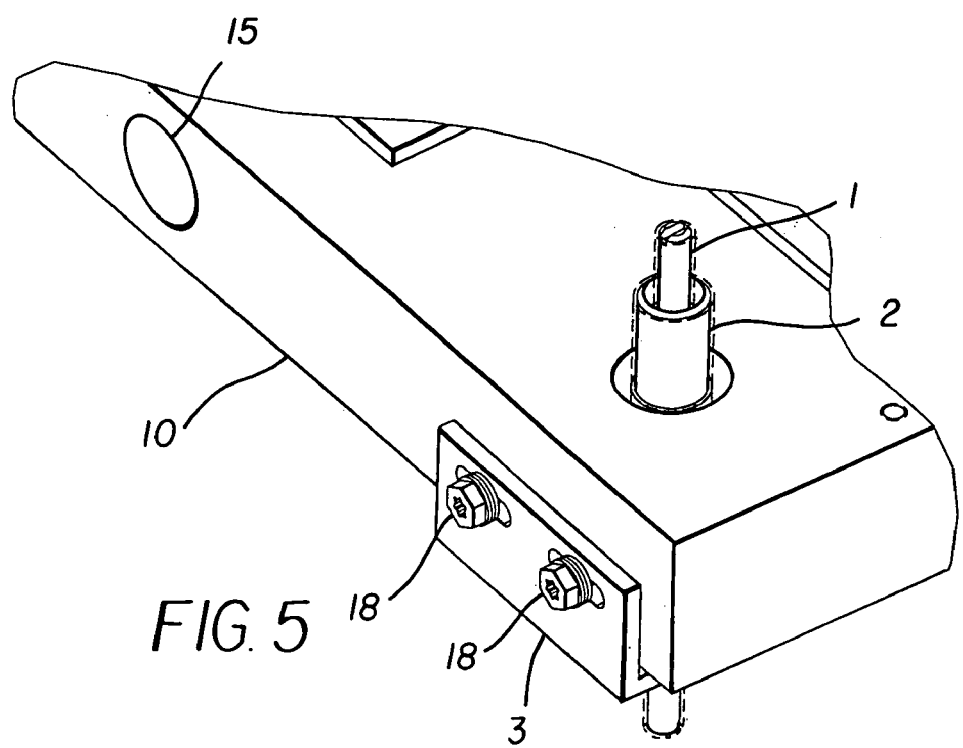

Referring to FIGS. 1 and 6, the optics deck 10 is translated along axis D—D and rotated about points G and H by turning knobs 14, 13, 12 respectively. These knobs 14, 12, 13 utilize a screw that in turn pushes on plates 15 pressed into the optics deck 10. The knobs 14, 13, 12 are mounted on station 11 and are held in intimate contact with the plates 15 via a spring 19 at each location. This repositions the optics deck 10 in relation to the detection device 16. Since the leveler 1 and its mount 2 are installed in an oversize hole 100, the translation of the optics deck 10 does not change the relationship between the leveler 1 and the pins 4. Once the optics deck 10 has been aligned, the holder 3 for the leveler mount 2 is tightened to the optics deck 10 by means of screws 18 (FIG. 4). This prevents rotation of the leveler mount 2 while tightening the holding nut 6 against washer 8. The leveler 1 is likewise held in position by tightening of holding nut 7 (FIG. 3). After everything is secured the optics deck 10 can be placed into a matching set of pins that is located in the machine. It is then tightened into place within the machine by a spherical nut 5, against a washer 9 similar to how it is shown in FIG. 3.

Following is the procedure for aligning the optics deck 10 with the alignment station 11.

First the optics deck assembly 10 is roughly positioned with respect to the alignment station 11 and the beam detector 16. This is accomplished in the following method: Place optics deck assembly 10 on the alignment station 11 such that the three levelers 1 are in contact with pins 4 in locations A, B, and C. At this point in time, the six nuts 5,6 and the three leveler holders 3 are not yet tightened. Attach three springs 19 to the optics deck assembly 10 in locations D, E, and F. The three adjustment knobs 12, 13, 14 should have the adjustment tip contacting the slide plate 15 in all three locations. The three levelers 1A, 1B, 1C should then be adjusted such that the bottom surface of the optics deck assembly is roughly parallel to the top surface of the alignment station 11. The three levelers 1A–1C are then adjusted to bring the optics deck assembly 10 close to a known optical height above the beam detector 16. Knobs 12 and 13 are then adjusted to bring the centerline of slot D—D in line with the centerline of the beam detector 16. Knob 14 is then adjusted to position the optics deck assembly 10 such that it is roughly centered on the top of the alignment station 11 along line D—D. This will roughly position the optics deck assembly to the alignment station 11.

Now the position needs to be "fine-tuned".

The table slide 17 should be moved to position the beam detector 16 near the midpoint of a line between points G and H. The laser beam emanating from the optics deck assembly 10 will then be moved to land upon the detector by changing the elevations of the leveler at position C. This will change the optics deck assembly 10 position about line A-B.

The table slide 17 should now be moved to position the beam detector 16 at point G. The knobs 12, 13, 14 are adjusted to bring the laser beam into position such that it illuminates upon the beam detector 16. This positions the deck in the X and Y plane. Now move the table slide 17 to position (H) and adjust knob 12 to position the laser beam on the detector 16. This rotates the optics deck assembly about point G and aligns the beam to line D—D.

Now the elevation and focus depth (z-axis) needs to be set along line D—D. The table slide 17 should be moved to position the beam detector 16 at point G. The levelers 1 at points A, B or C are adjusted to bring the beam into focus at point G. The table slide 17 is then moved to position the detector 16 at point H and the levelers 1 are again adjusted.

You may need to repeat the sequence a second time to further "fine-tune" the system.

After all settings have been made, the optics deck assembly 10 is locked to the levelers 1 in the following fashion: The leveler holders 3 are locked in place by tightening screws 18. The leveler mounts 2 are then secured to the deck by tightening nut 6. The leveler holders 3 prevent the rotation of the leveler mounts 2 during tightening. The elevation of the leveler 1 within the leveler mount 2 is then fixed by tightening nut 7.

After removal from the alignment station 11 and placed within an imaging device, the optics deck assembly 10 is fastened to the imaging device by use of a washer 9 and by tightening a spherical nut 5.

Figure 8:
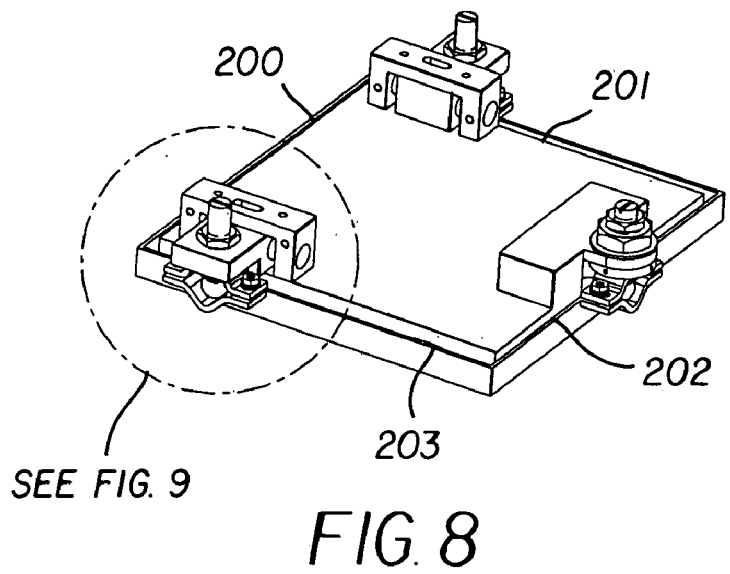
FIG. 8 is a top perspective view showing another embodiment of the present invention incorporated in an optical module.
Figure 9:
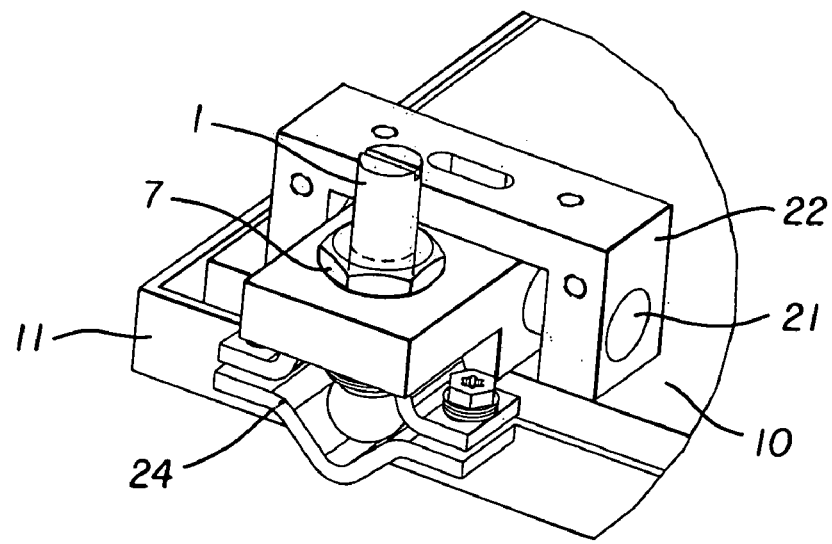
FIGS. 9 and 10 are perspective views showing details of one component of the embodiment of FIG. 8.
Figure 10:
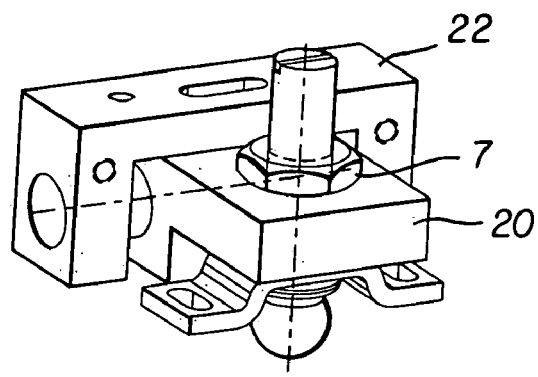
Figure 11:
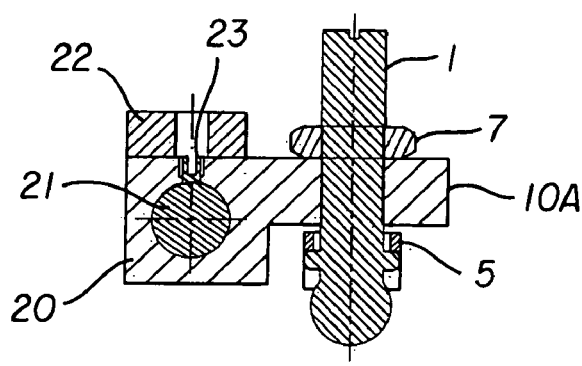
FIG. 11 is a sectional elevational view of the embodiment component of FIGS. 9 and 10.
Figure 12:
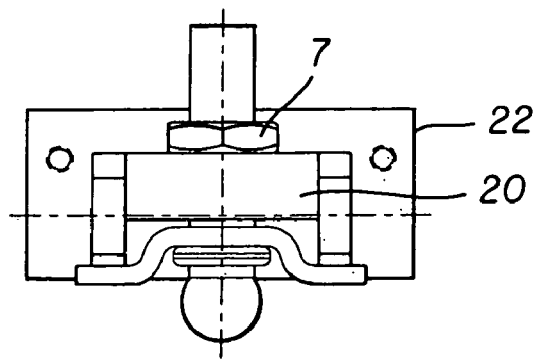
FIG. 12 is an elevational view of the embodiment component of FIGS. 9 and 10.
Figure 13:
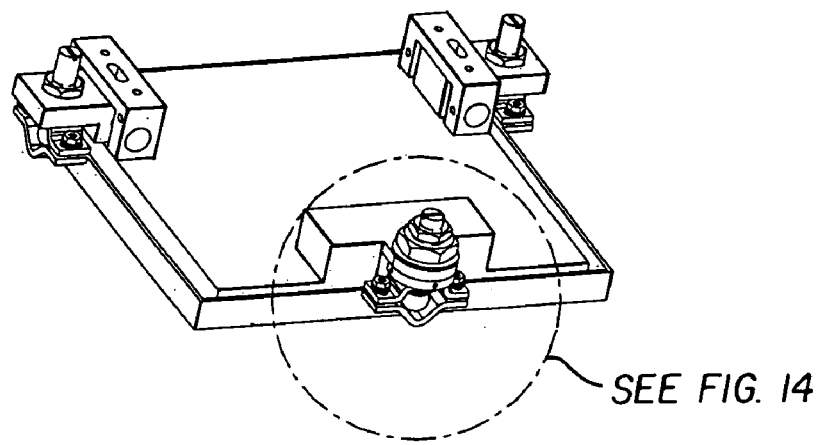
FIG. 13 is a perspective view showing a slightly different perspective of the optical module of FIG. 8.
Figure 14:
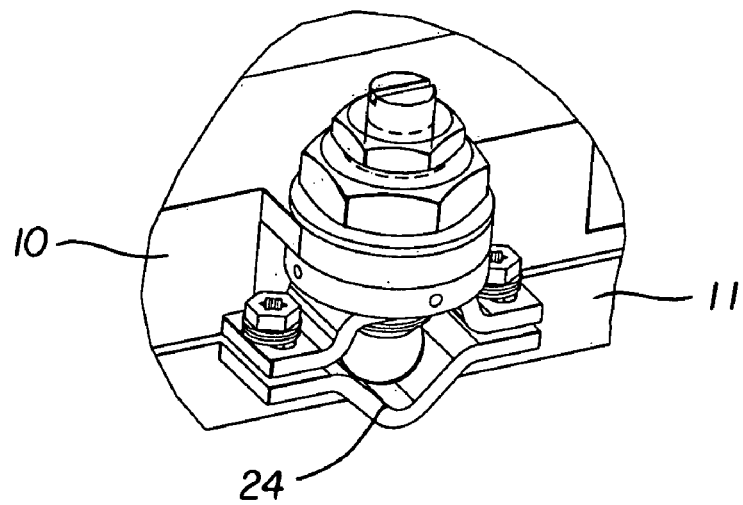
FIGS. 14 and 15 are perspective views showing details of another component of the embodiment of FIG. 8.
Figure 15:
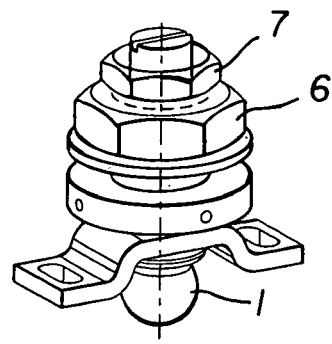
Figure 16:
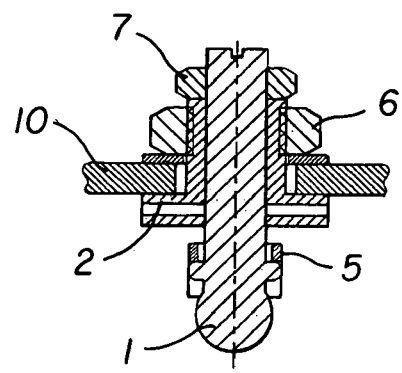
FIG. 16 is an elevational sectional view of the embodiment component of FIGS. 14 and 15.
Figure 17:
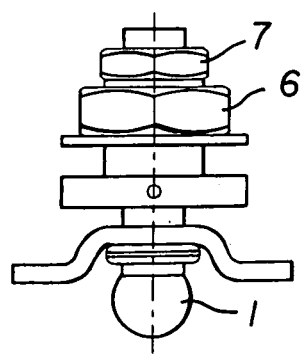
FIG. 17 is an elevational view of the embodiment component of FIGS. 14 and 15.
Figure 18:
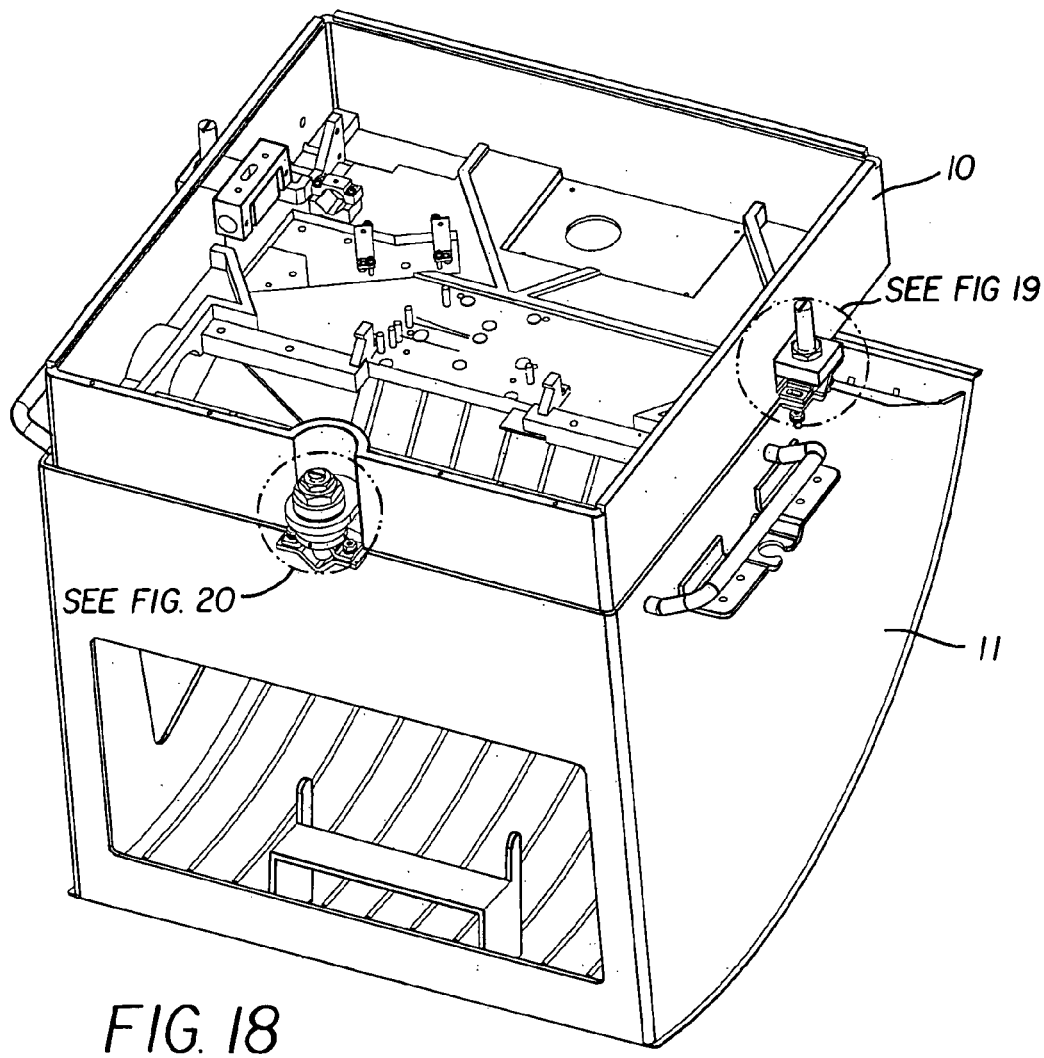
FIG. 18 is a perspective view of apparatus which mounts an optical module incorporating an embodiment of the present invention.
Figure 19:
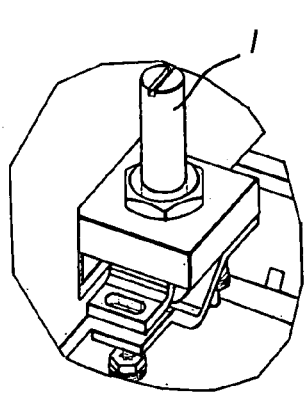
FIGS. 19 and 20 are detail perspective views of the embodiment components of FIG. 18.
Figure 20:
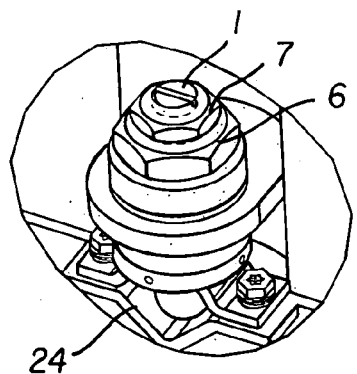

Referring now to FIGS. 8–20, there is shown another embodiment of the present invention. In order to create a more stable starting position and if space restraints do not allow the earlier embodiment, the following embodiment can be used instead. FIGS. 8 and 13 show the base optics deck 10 located within a frame and held in position by the same three levelers 1. Planar member 10A has first, second, third and fourth sides 200, 201, 202, 203. While one leveler 1 is screwed into the leveler mount 2, which is installed in an oversized hole in the optics deck 10, the other two levelers 1 are screwed into a linear mount 20. This linear mount 2 can slide along a horizontal pin 21, which is mount in its pin mount 22. The optics deck 10 and the pin mount 22 are tied together. During adjustment the two side assemblies (FIG. 10) can slide back and forth on the pins, while the third assembly (FIG. 15) can move freely within its clearance hole. After the final position is reached the side assemblies can be held in place by tightening the set screws 23, and the front assembly can be fixed by tightening the nut 6 against washer 8. The height and tilt adjustment can be done by turning the three leveler 1. By tightening the nuts 7 the final position can be locked. The optics deck 10 can now be placed in the imaging system frame 110 with its V-grooves 24 and locked by screwing the clamp 5 onto the V-grooves 24 (FIGS. 18–20).

The invention has been described in detail with particular reference to certain preferred embodiments thereof, but it will be understood that variations and modifications can be effected within the spirit and scope of the invention.

PARTS LIST 1 leveler
2 leveler mount
3 leveler mount holder
4 pins
5 spherical nut
6 holding nut
7 holding nut
8 washer
9 washer
10 optics deck
11 optics alignment station
12 turning knob
13 turning knob
14 turning knob
15 plate
16 detection device
17 translation table
18 screws
19 spring
20 linear mount
21 horizontal pin
22 pin mount
23 screws
24 v-grooves
100 oversize hole
102 sphere
110 imaging system frame
200 linear side
201 linear side
202 linear side
203 linear side

What is claimed is:

1. An optics deck for supporting an optical system comprising:
   a planar member having a linear scanline slot;
   three vertically adjustable leveler assemblies located at three apexes of a triangle which enclose the slot and which has sides which establish axes about which vertical adjustment of the leveler assemblies is carried out to bring the bottom surface of the planar member parallel to and at a known height from a known planar surface;
   means for mounting said leveler assemblies on said planar member such that said planar member can be translated in three degrees of freedom relative to said leveler assemblies without changing the vertical adjustment of said leveler assemblies, said means for mounting including three oversize holes in said planar member in which said three leveler assemblies are installed; and
   wherein each of said leveler assemblies include a vertically adjustable leveler, a leveler mount, a leveler mount holder and means for fixedly securing said holder to said planar member.

2. An optics deck for supporting an optical system comprising:
   a planar member having a linear scanline slot;
   three vertically adjustable leveler assemblies located at three apexes of a triangle which enclose the slot and which has sides which establish axes about which vertical adjustment of the leveler assemblies is carried out to bring the bottom surface of the planar member parallel to and at a known height from a known planar surface;
   means for mounting said leveler assemblies on said planar member such that said planar member can be translated in three degrees of freedom relative to said leveler assemblies without changing the vertical adjustment of said leveler assemblies; and
   wherein said three degrees of freedom in which said planar member can be translated include linear translation along an axis coincident to a centerline of said scan line slot and respective rotational translation about two points representing end points of a scanline at a media plane.

* * * * *